US012150200B2

(12) United States Patent
Yang et al.

(10) Patent No.: US 12,150,200 B2
(45) Date of Patent: Nov. 19, 2024

(54) DIFFERENTIATED DISCONTINUOUS RECEPTION BASED ON USER EQUIPMENT SERVICE PROFILE

(71) Applicant: Verizon Patent and Licensing Inc., Basking Ridge, NJ (US)

(72) Inventors: Jin Yang, Orinda, CA (US); Susan Wu Sanders, Bridgewater, NJ (US); Monte Giles, Chester, NJ (US); Yong Sang Cho, Old Tappan, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/522,181

(22) Filed: Nov. 9, 2021

(65) Prior Publication Data

US 2023/0284330 A1     Sep. 7, 2023

(51) Int. Cl.
| | |
|---|---|
| H04W 72/543 | (2023.01) |
| H04B 7/06 | (2006.01) |
| H04J 3/16 | (2006.01) |
| H04W 40/12 | (2009.01) |
| H04W 76/28 | (2018.01) |
| H04W 84/12 | (2009.01) |

(52) U.S. Cl.
CPC ......... H04W 76/28 (2018.02); H04W 72/543 (2023.01)

(58) Field of Classification Search
CPC ... H04W 84/045; H04W 76/28; H04W 76/10; H04W 72/087; H04W 76/38; H04W 52/0209; H04W 28/0268; H04W 48/12; H04W 8/186; H04W 72/543; H04L 2209/80; H04L 1/1887; H04L 27/261
USPC .................................................. 370/329, 331
See application file for complete search history.

(56) References Cited

U.S. PATENT DOCUMENTS

| | | | |
|---|---|---|---|
| 10,701,601 B1* | 6/2020 | Tayal ................ | H04W 36/0079 |
| 2015/0131504 A1* | 5/2015 | Lin ................... | H04W 52/0225 |
| | | | 370/311 |
| 2016/0014691 A1* | 1/2016 | Rastogi ............ | H04W 52/0209 |
| | | | 370/311 |
| 2017/0289995 A1* | 10/2017 | Lin ....................... | H04W 72/23 |
| 2018/0146430 A1* | 5/2018 | Yadav ................ | H04W 52/024 |
| 2019/0104537 A1* | 4/2019 | Yasukawa ............ | H04W 72/20 |
| 2020/0267670 A1* | 8/2020 | Åström ................ | H04W 48/10 |
| 2020/0267785 A1* | 8/2020 | Talebi Fard ........ | H04W 40/248 |
| 2021/0045182 A1* | 2/2021 | Raghunathan ........ | H04W 76/27 |
| 2021/0410107 A1* | 12/2021 | Park ...................... | H04W 76/28 |
| 2022/0030661 A1* | 1/2022 | Jeong ................ | H04W 72/0406 |
| 2022/0191966 A1* | 6/2022 | Wang ................ | H04W 52/0216 |
| 2022/0330148 A1* | 10/2022 | Kim .................. | H04W 52/0216 |
| 2023/0180089 A1* | 6/2023 | Panwar ............. | H04W 36/0085 |
| | | | 370/331 |

* cited by examiner

*Primary Examiner* — Marcus Smith
*Assistant Examiner* — Jason A Harley

(57) ABSTRACT

A device receives a message associated with creating a session for a User Equipment device (UE), the messaging identifying a Quality of Service (QoS) for the UE. The device adjusts discontinuous reception (DRx) parameters for the UE based on the identified QoS for the UE and instructs the UE to increase or decrease a DRx wait time based on the adjusted DRx parameters.

20 Claims, 12 Drawing Sheets

DIFFERENTIATED DISCONTINUOUS RECEPTION BASED ON USER EQUIPMENT SERVICE PROFILE

BACKGROUND

Discontinuous reception (DRx) involves a process of turning off a device's receiver when the device does not expect to receive incoming messages. DRx, due to powering down the components of the receiver, reduces power drain on the device's battery. For DRx to operate, such as in the context of a wireless mobile network, the device must coordinate with the wireless mobile network to schedule incoming messages such that the device's receiver wakes up during scheduled periods to receive the incoming messages.

DETAILED DESCRIPTION OF EXAMPLE EMBODIMENTS

The following detailed description refers to the accompanying drawings. The same reference numbers in different drawings may identify the same or similar elements. The following detailed description does not limit the invention.

Embodiments described herein enable the differentiation of DRx among UEs based on service profiles of the UEs, including UE group identities and Quality of Service (QoS) requirements associated with the UEs. For a UE service request, the mobile network may obtain a QoS identifier (ID), such as a QoS Class Identifier (QCI) or a Fifth Generation (5G) QoS Identifier (5QI), and/or a UE group ID, such as a Subscriber Profile Identifier (SPID) or a network slicing identifier (e.g., a Network Slice Selection Assistance Information (S-NSSAI) value) and generates a DRx profile for the UE based on the QoS ID and/or the UE group ID. Generation of the DRx profile may include determining parameters associated with the DRx process that increase or decrease UE DRx wait time in accordance with the UE group ID and/or the QoS ID. The DRx parameters that may be adjusted may include a value of the DRx On Duration Timer, a value of the DRx Short Cycle Timer, a value of the DRx Inactivity Timer, and/or a value of the DRx Retransmission timer. One or more nodes of the mobile network (e.g., an evolved NodeB (eNB) or Next Generation NodeB (gNB)) may adjust the DRx parameters for the particular UE based on the UE's generated DRx profile. The mobile network may then send instructions that include the adjusted DRx parameters to the UE. The UE may subsequently perform DRx, based on the instructions and the adjusted DRx parameters, with the UE DRx wait time being based on the adjusted DRx parameters. The adjusted DRx parameters may increase or decrease one or more metrics associated with UE reception from, or transmission to, the mobile network.

Figure 1A:
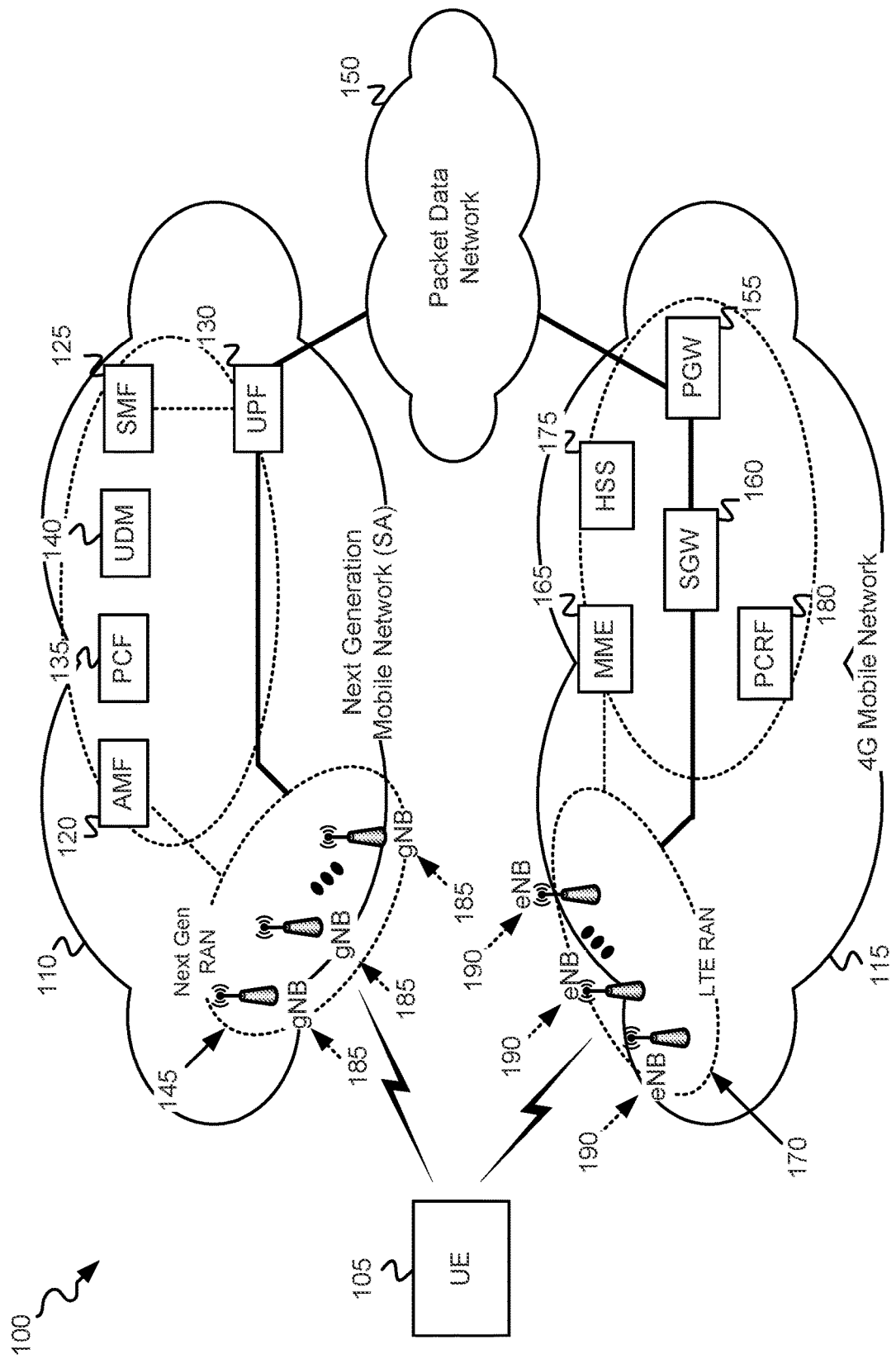
FIGS. 1A and 1B depict examples of a network environment in which DRx parameters are adjusted based on user equipment device service profiles to increase or decrease DRx wait time for sending/receiving transmissions to/from a wireless network.
Figure 1B:
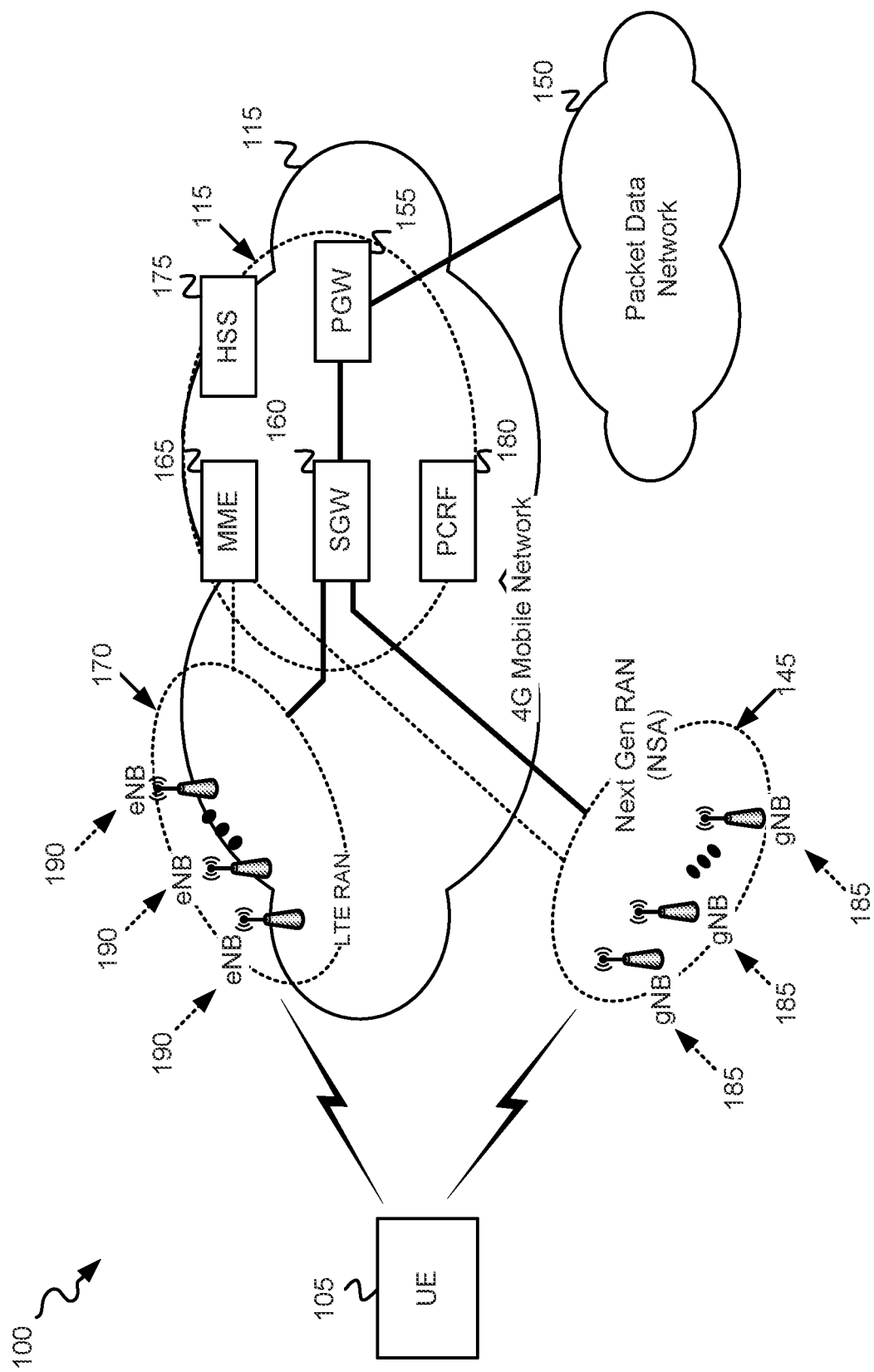

FIGS. 1A and 1B depict two examples of a network environment 100 in which DRx parameters may be adjusted based on a UE's service profile to increase or decrease UE DRx wait time for receiving transmissions from, or sending transmissions to, a wireless network. In the first example of network environment 100, shown in FIG. 1A, the network environment 100 includes a UE 105 that may wirelessly communicate with a stand-alone (SA) Next Generation mobile network 110 and/or a Fourth Generation (4G) mobile network 115. In the example network environment 100 of FIG. 1A, UE 105 may establish a wireless connection with Next Generation Mobile Network 110 and/or 4G Mobile Network 115, to communicate with another UE (not shown) or with another network node, such as, for example, a server.

UE 105 may include any type of electronic device having a wireless communication capability. UE 105 may include, for example, a laptop, palmtop, desktop, or tablet computer; a cellular phone (e.g., a "smart" phone); a Voice over Internet Protocol (VoIP) phone; a smart television (TV); an audio speaker (e.g., a "smart" speaker); a video gaming device; a music player (e.g., a digital audio player); a digital camera; a device in a vehicle; a wireless telematics device; an Augmented Reality/Virtual Reality (AR/VR) headset or glasses; or an Internet of Things (IoT) or Machine-to-Machine (M2M) device. A user (not shown) may carry, use, administer, and/or operate UE 105. Though only a single UE 105 is depicted in FIG. 1A, network environment 100 may include multiple UEs 105 communicating via networks 110 and/or 115.

Next Generation mobile network 110 includes any type of a Public Land Mobile Network (PLMN) that includes evolved network components (e.g., future generation components) relative to a Long-Term Evolution (LTE) network, such as a Fourth Generation (4G) or 4.5G mobile network. In one implementation, shown in FIG. 1A, Next Generation Mobile network 110 may include a Fifth Generation (5G) mobile network. 4G network 115 includes any type of a PLMN that implements a LTE mobile telecommunications standard, such as the 4G or 4.5G LTE standard.

As shown in the example implementation of FIG. 1A, in which Next Generation Mobile Network 110 includes a 5G Stand-Alone (SA) mobile network, network 110 may include, among other nodes, functions, or components, an Access and Mobility Management Function (AMF) 120, a Session Management Function (SMF) 125, a User Plane Function (UPF) 130, a Policy Control Function (PCF) 135, a User Data Management (UDM) function 140, and a Next Generation Radio Access Network (RAN) 145.

AMF 120 may include functions executed by a network device to perform UE-based authentication, authorization, and mobility management for UE 105. SMF 125 may include functions executed by a network device to perform session management and to select and control particular nodes (e.g., User Plane Functions (UPFs)) for data transport, including applying policy rules received from PCF 135. UPF 130 may include functions executed by a network device to act as a router and a gateway between Next Generation Mobile network 110 and an external packet data network 150, and to forward session data between the packet data network 150 and Next Generation RAN 145. Though only a single UPF 130 is shown in FIG. 1A, Next Generation Mobile network 110 may include multiple UPFs 130 disposed at various geographic locations in network 110. Packet data network 150 may include any type of packet-switching network, such as, for example, the Internet.

PCF 135 may include functions executed by a network device to implement policy control for service data flows and Protocol Data Unit (PDU) session related policy control. For example, PCF 135 may store and/or generate policy rule sets that may apply to traffic from different UEs 105 and may supply one or more policy rules to a SMF 125 handling a UE session. UDM 140 may include functions executed by a network device to manage data for user access authorization, user registration, and data network profiles. UDM 140 may include, or operate in conjunction with, a User Data Repository (UDR—not shown) which stores user data, such as customer profile information, customer authentication information, and encryption keys.

Next Generation RAN 145 may include at least one Central Unit (CU) (not shown), one or more Distributed Units (DUs) (not shown), and one or more Radio Units (RUs)(not shown). Each CU includes a network device that operates as a digital function unit that transmits digital baseband signals to the multiple DUs, and receives digital baseband signals from the multiple DUs. If a CU is connected to the multiple DUs via, for example, optical fibers, then the CU may convert the digital baseband signals into corresponding optical signals for transmission to the DUs, and may receive optical signals from the DUs and convert the optical signals into corresponding digital baseband signals. The DUs and RUs include network devices that operate as radio function units that transmit and receive radio frequency (RF) signals to/from UEs 105. Each of the RUs may include at least one antenna array, transceiver circuitry, and other hardware and software components for enabling the RUs to receive data via wireless RF signals from UEs 105, and to transmit wireless RF signals to UEs 105. If Next Generation Mobile network 110 is a 5G New Radio (NR) network, a CU and DUs represent a distributed Next Generation NodeB, which may also be referred to herein as a "gNB" or a "base station." The CU and DUs may also represent an enhanced LTE (eLTE) eNB, also referred to herein as a "base station," that can connect to Next Generation Mobile network 110.

As shown in the example implementation of FIG. 1A, network environment 100 may further include a 4G mobile network 115. 4G mobile network 115 may include, among other functions, nodes, or components, a Packet Gateway (PGW) 155, a Serving Gateway (SGW) 160, a Mobility Management Entity (MME) 165, a Home Subscriber Server (HSS) 175, a Policy and Charging Rules Function (PCRF) 180, and an LTE RAN 170.

PGW 115 includes functions executed by a network device to act as a router and a gateway between 4G network 130 and the external packet data network 150, and to forward session data between the packet data network 150 and an LTE RAN 170. SGW 160 includes functions executed by a network device to route and forward session data between PGW 155 and the LTE RAN 170 serving the UE session. MME 165 includes functions executed by a network device to act as a control entity for 4G Mobile Network 115, including communicating with HSS 175 for user/device authentication and for user/device profile download. MME 235 further provides UE 105 with mobility management and session management functions using, for example, Network Access Stratum (NAS) signaling. HSS 175 includes functions executed by a network device to perform user authentication, session establishment, and/or access authorization based on stored subscriber service profiles. PCRF 180 includes functions executed by a network device to deploy policy and charging rules to allocate network resources and manage charges for services and subscribers.

LTE RAN 170 may include baseband units (BBUs—not shown) and remote radio heads (RRHs—not shown). Each BBU may connect to multiple RRHs via, for example, optical fibers, and may operate as a digital function unit that transmits digital baseband signals to the multiple RRHs and receives digital baseband signals from the multiple RRHs. The RRHs include network devices that operate as radio function units that transmit and receive radio frequency (RF) signals to/from UE 105. If the RRHs are connected to a BBU via an optical fiber, the RRHs may convert received RF signals to optical signals and transmit the optical signals to the BBU. Additionally, the RRHs may receive optical signals from the BBU via the optic fiber and convert the optical signals to RF signals for transmission via one or more antennas (e.g., one or more antenna arrays) of the RRHs. Each of the RRHs may include at least one antenna array, transceiver circuitry, and other hardware and software components for enabling the RRHs to receive data via wireless RF signals from UE 105, and to transmit wireless RF signals to UE 105. In 4G mobile network 115, a BBU and a RRH represent a distributed eNB, such as is shown in FIG. 1A, and may also be referred to herein as a "base station."

In the second example of a network environment 100, shown in FIG. 1B, the network environment 100 includes a UE 105 that may wirelessly communicate with a hybrid 4G/Next Generation mobile network. The hybrid 4G/Next Generation mobile network may include a 4G mobile network 115, such as is described above with respect to FIG. 1A, that further connects with a Non-Stand Alone (NSA) Next Generation RAN 145. NSA Next Generation RAN 145 includes components similar to those described above with respect to Next Generation RAN 145 of FIG. 1A. In the example network environment 100 of FIG. 1B, UE 105 may establish a wireless connection with 4G mobile network 115, via either LTE RAN 170 and/or NSA Next Generation RAN 145, to communicate with another UE (not shown) or with another network node, such as a server.

The configuration of network components of network environment 100 shown in FIGS. 1A and 1B is for illustrative purposes. Other configurations may be implemented. Therefore, network environment 100 may include additional, fewer, and/or different components that may be configured in a different arrangement than that depicted in FIGS. 1A or 1B. For example, network environment 100 may include numerous UEs (e.g., UEs 105-1 through 105-x, where x>2). Further, network environment 100 may include additional networks not shown in FIGS. 1A or 1B.

Figure 2A:
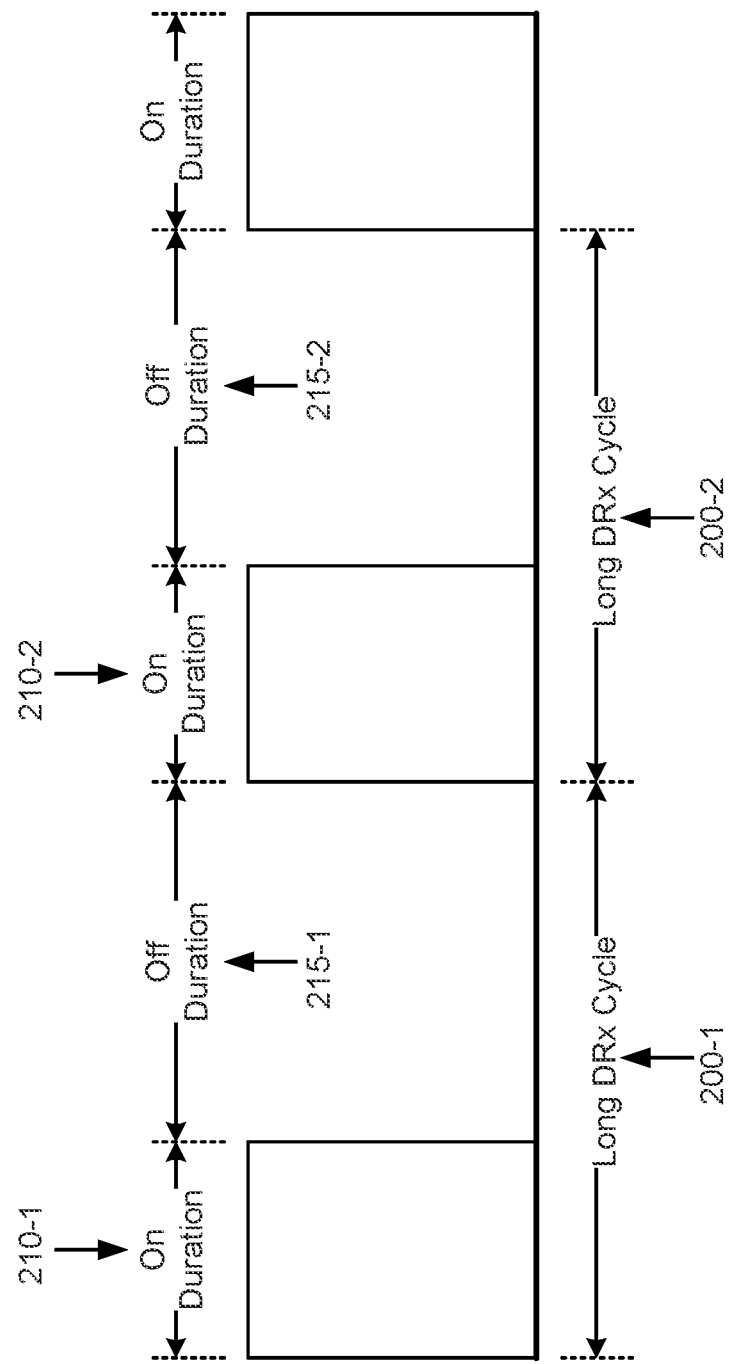
FIGS. 2A-2C depict example timing diagrams associated with a DRx process.
Figure 2B:
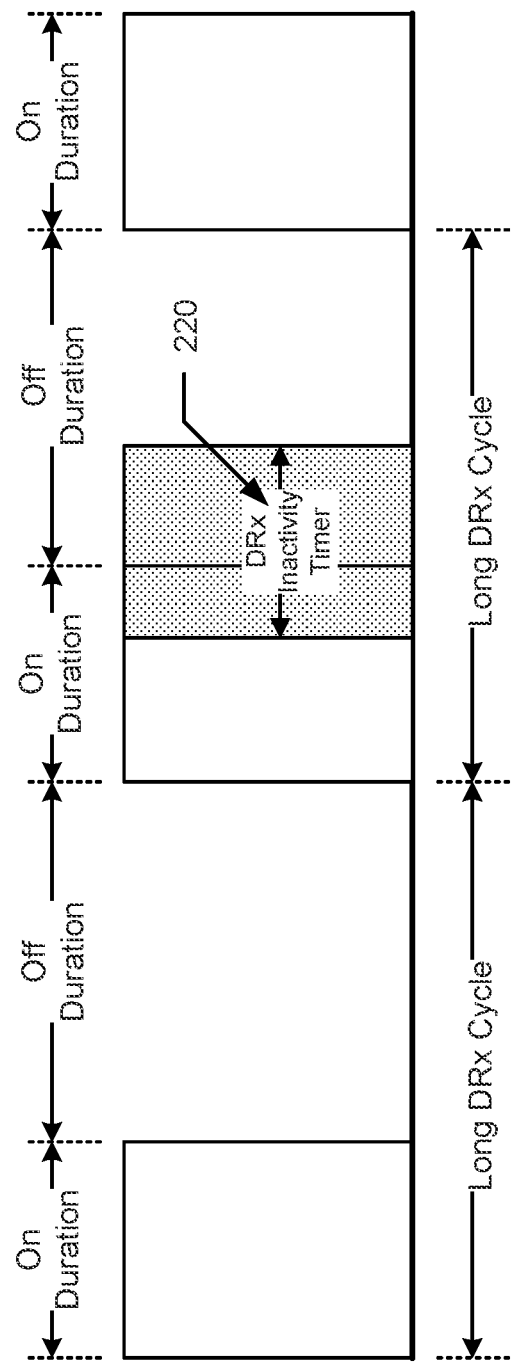
Figure 2C:
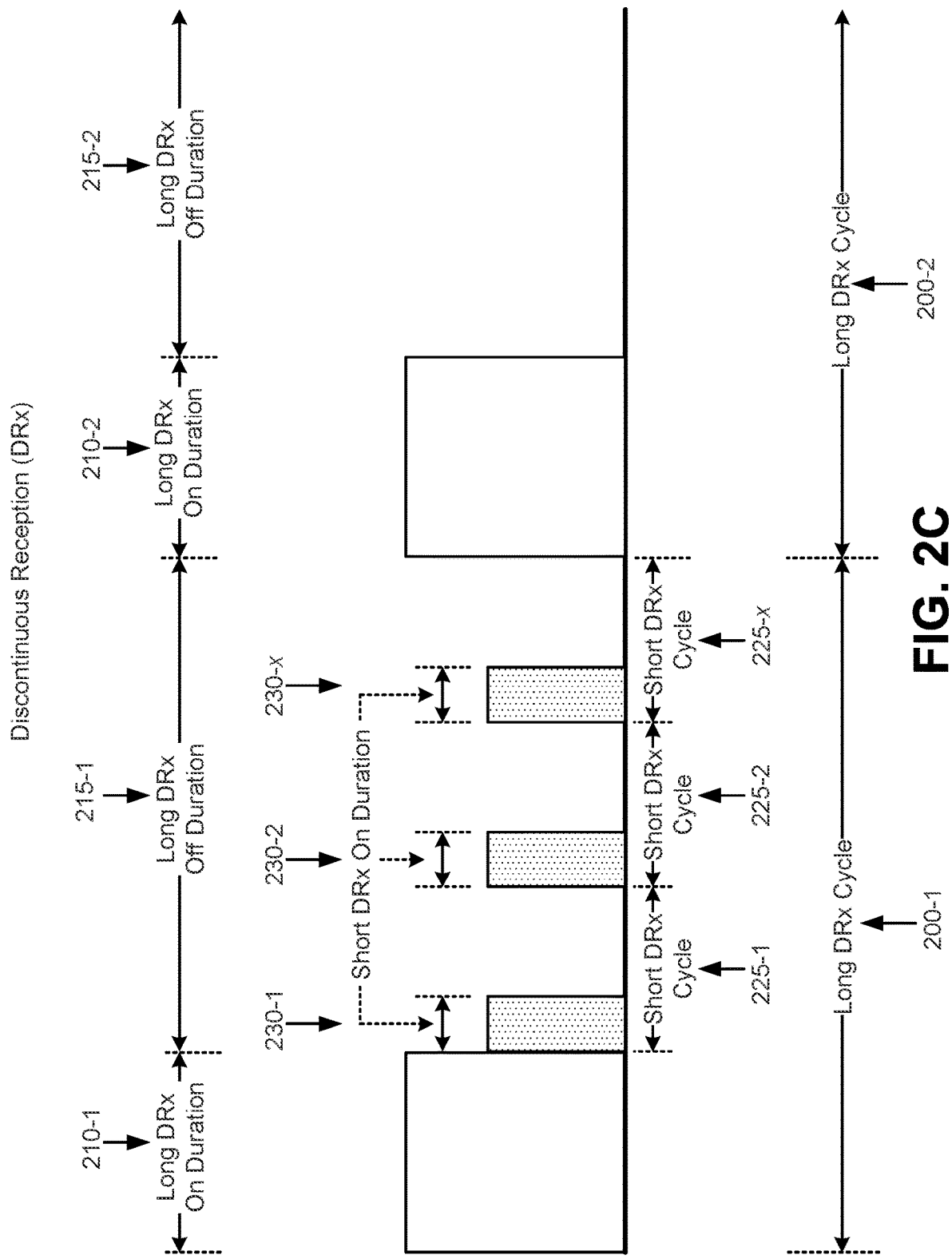

FIGS. 2A-2C depict timing diagrams associated with a discontinuous reception (DRx) process, as implemented herein. The DRx process, as described further below, controls the UE 105's DRx wait time. The "DRx wait time," as referred to herein, may include a time duration between a time at which uplink data is received at the UE 105 and a time at which a Service Request (SR) is sent by the UE 105, and includes any intervening wait time caused by components of the UE 105 being in a powered down state during the DRx process and may additionally include a time duration over which the UE 105 waits on an uplink grant from the mobile network in response to the SR. The "DRx wait time," as referred to herein may further include a time duration over which the UE 105 waits, due to components of the UE 105 being in a powered down state during the DRx process, before the components resume a powered-up state and the UE 105 may then receive signaling or data on a downlink from the mobile network. As shown in FIG. 2A, DRx may include a sequence of DRx cycles, referred to herein as "long DRx cycles," that occur one after another over a period of time. For example, as shown in FIG. 2A, the DRx process may include a first long DRx cycle 200-1, followed by a second long DRx cycle 200-2, and so on. Each long DRx cycle 200 further includes an "on duration" period, during which components of the UE 105 are in a powered up state to receive RF signals, and an "off duration" period, during which one or more components of the UE 105 are in a powered down state, or sleep state, to conserve UE power. In the example shown in FIG. 2A, the first long DRx cycle 200-1 includes an on duration period 210-1 and an off duration period 215-1. The second long DRx cycle 200-2 includes an on duration period 210-2 and an off duration period 215-2, and so on. The on duration period 210 may be specified by an "ON Duration Timer" that sets the duration of the on duration period 210 within one DRx cycle.

FIG. 2B depicts a DRx inactivity timer 220 associated with the DRx process of FIG. 2A. The DRx inactivity timer 220 includes a timer value that specifies how long the UE 105's receiver should remain "on," before powering down, after the receipt of a signal on a control channel (e.g., the Physical Downlink Control Channel (PDCCH)) from the RAN 145 or 170.

FIG. 2C depicts an additional sequence of DRx cycles, referred to herein as "short DRx cycles," that may occur one after another over a period of time during an Off Duration 215. In FIG. 2C, the "on duration" of FIG. 2A is shown in FIG. 2C as a "Long DRx On Duration" and the "Off Duration" is shown as a "Long DRx Off Duration." For example, the first long DRx Cycle 200-1 includes a Long DRx On Duration 210-1 and a Long DRx Off Duration 215-1, and the second long DRx Cycle 200-2 includes a Long DRx On Duration 210-1 and a Long DRx Off Duration 215-2. The short DRx cycles may occur one after another during a Long DRx Off Duration 215 of a Long DRx Cycle 200. For example, as shown, multiple short DRx cycles 225-1 through 225-x may occur during Long DRx Off Duration 215-1, with each short DRx cycle 225 including a short DRx On Duration 230-1 through 230-x, respectively. A duration of a short DRx cycle 225 may be specified by a "DRx Short Cycle Timer" that sets a period of time (e.g., a number of subframes) that the UE 105 shall follow a short DRx cycle after the DRx Inactivity Timer 220 has expired.

The On Duration Timer, the DRX Short Cycle Timer, and/or the DRx Inactivity Timer, described above, may be adjusted via instructions from the LTE RAN 170, the Next Generation RAN 145, or another node(s) in the mobile network (e.g., network 110 or 115) to increase or decrease the UE reception wait-time. Additional DRx parameters, other than the On Duration Timer, the DRX Short Cycle Timer, or the DRx Inactivity Timer, may be modified/adjusted to change the UE reception wait-time. For example, a DRx Retransmission timer, that specifies a period of time (e.g., a maximum number of consecutive PDCCH subframes) that the UE 105 should remain active to wait on an incoming retransmission after the first available retransmission time, may alternatively, or additionally, be adjusted/modified. Any DRx parameter that may impact the UE DRx wait-time, including additional and/or different DRx parameters than those described herein, may be adjusted consistent with the techniques described herein.

Figure 2D:
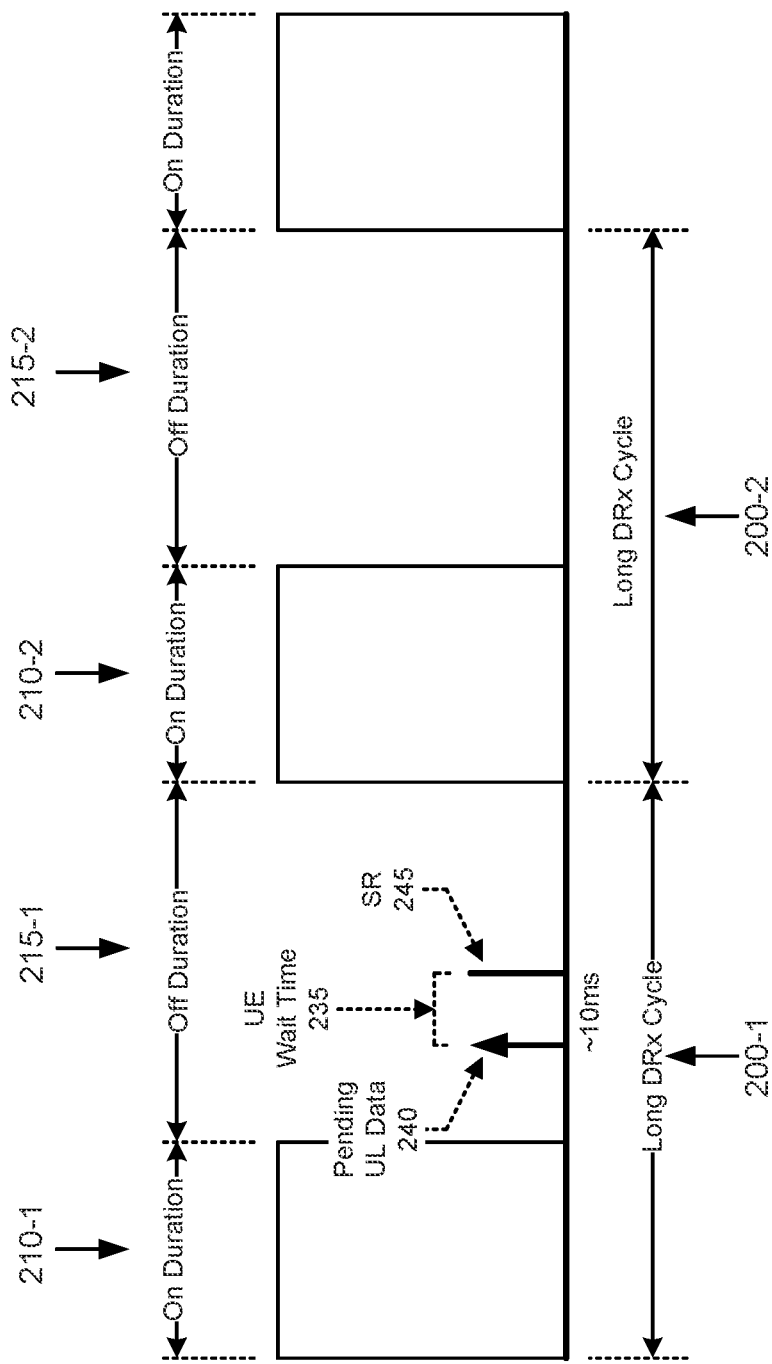
FIG. 2D depicts an example timing diagram associated with DRx performed by a User Equipment device (UE) in a power saving mode.

FIG. 2D depicts an example timing diagram associated with DRx performed by a UE 105 in a power saving mode. When DRx is performed by a UE 105 in the power saving mode, the UE 105's DRx wait time may, based on instructions from the mobile network, be permitted to increase to a certain maximum DRx wait time (e.g., 10 ms). The power saving mode depicted in FIG. 2D may involve UEs 105 receiving eMBB service from the mobile network, where the eMBB service involves greater bandwidth and improved download and upload speeds and where battery life at the UE 105 may be important. Alternatively, the power saving mode depicted in FIG. 2D may involve UEs 105 receiving network service with a particular QCI.

In this power saving mode, UE DRx wait time, between the existence of pending uplink data at the UE 105 and the UE 105 sending a SR, may be targeted for approximately 10 ms. FIG. 2D depicts a UE wait time 235 of ~10 ms occurring between the pending UL data 240, and the UE 105 (not shown) sending a SR 245 to the mobile network to request an uplink grant. The instructions from the mobile network may instruct the UE 105, when receiving network service in a power saving mode, to transmit a SR 245 at any point during the DRx process, such as during an off duration 215-1 of a long DRx cycle 200-1 shown in FIG. 2D, that is a certain period of time (e.g., 10 ms) after the pending UL data becoming available for transmission at the UE 105. Once the UE 105 receives a responsive UL grant from the mobile network, the UE 105 can transmit the pending UL data to the serving base station.

Figure 2E:
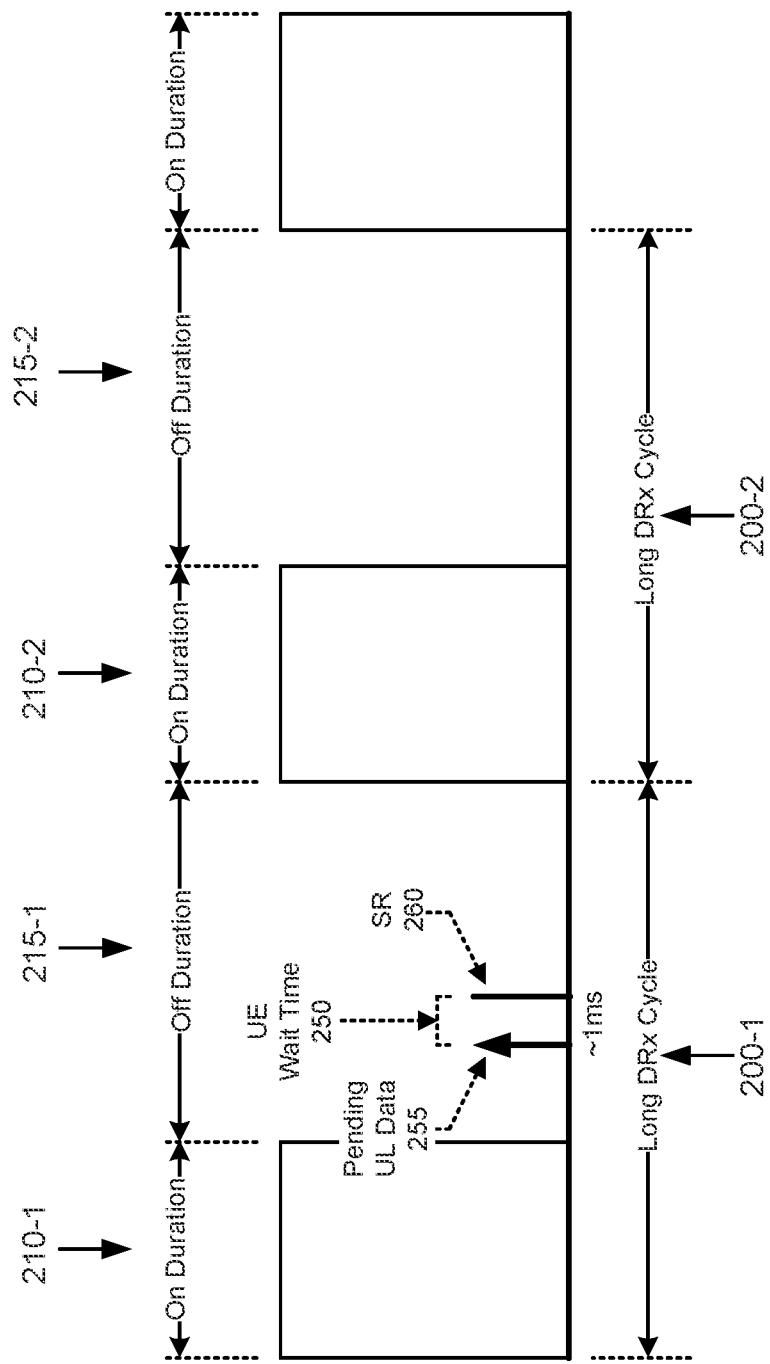
FIG. 2E depicts an example timing diagram associated with DRx performed by a UE in a low latency mode.

FIG. 2E depicts an example timing diagram associated with DRx performed by a UE 105 in a low latency mode. When DRx is performed by a UE 105 in the low latency mode, the UE 105's DRx wait time may, based on instructions from the mobile network, be decreased to a certain maximum DRx wait time (e.g., 1 ms) that may, for example, be less than the DRx wait time for the power saving mode of FIG. 2D. The low latency mode depicted in FIG. 2E may involve UEs 105 receiving URLLC service from the mobile network, where the URLLC service involves significantly lower latency. Alternatively, the low latency mode depicted in FIG. 2E may involve UEs 105 receiving network service with a particular QCI.

In this low latency mode, UE DRx wait time, between the existence of pending uplink data at the UE 105 and the UE 105 sending a SR, may be targeted for approximately 1 ms. FIG. 2E depicts a UE wait time 250 of ~1 ms occurring between the pending UL data 255, and the UE 105 (not shown) sending a SR 260 to the mobile network to request an uplink grant. The instructions from the mobile network may instruct the UE 105, when receiving network service in a low latency mode, to transmit a SR 260 at any point during the DRx process, such as during an off duration 215-1 of a long DRx cycle 200-1 shown in FIG. 2E, that is a certain maximum period of time (e.g., 1 ms) after the pending UL data becoming available for transmission at the UE 105. Therefore, in the low latency mode shown in FIG. 2E, the UE 105 is instructed to send the SR 260 in a much shorter period of time relative to, for example, the power saving mode of FIG. 2D to reduce latency. Once the UE 105 receives a responsive UL grant from the mobile network, the UE 105 can transmit the pending UL data to the serving base station.

Figure 3:
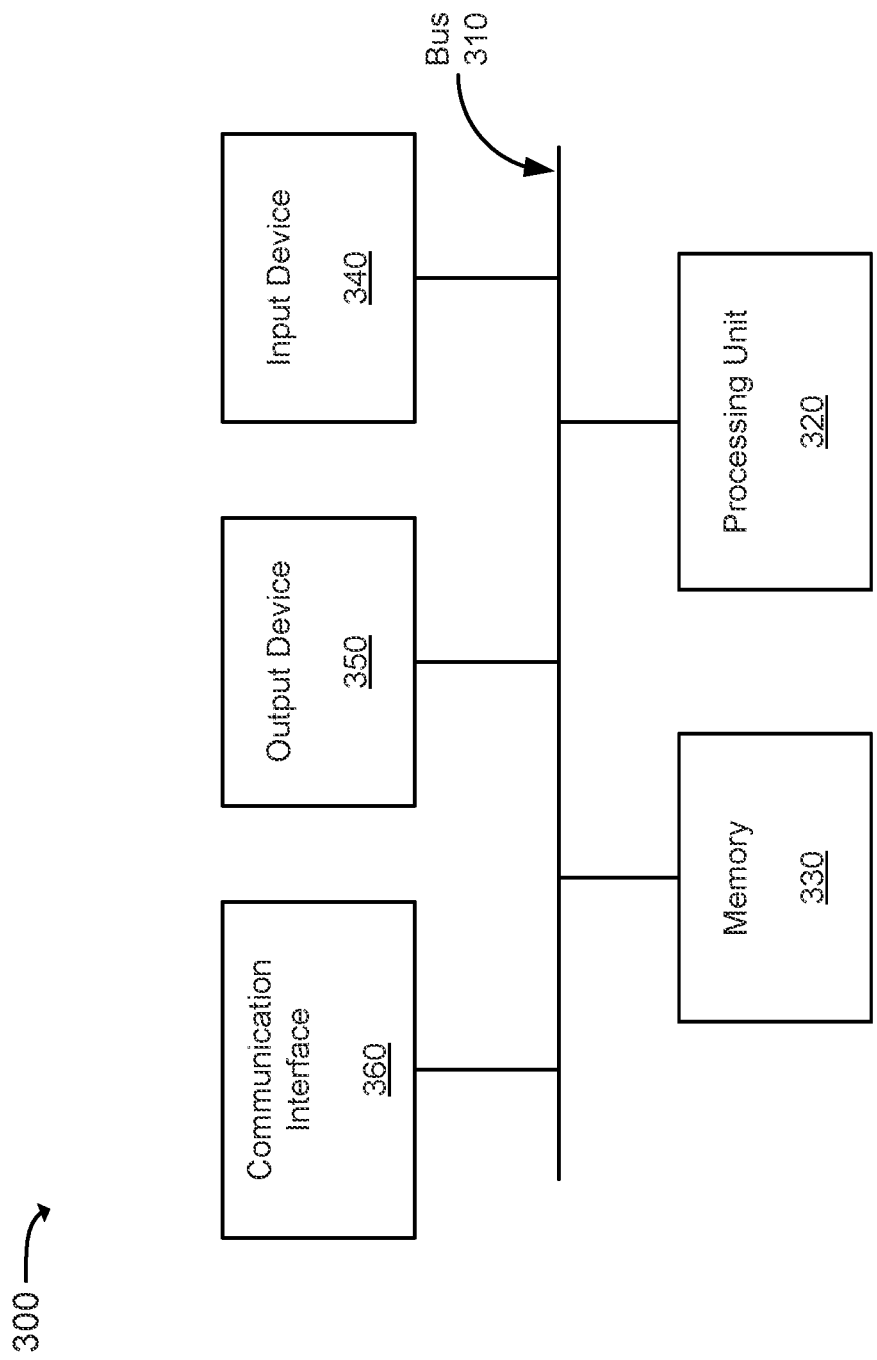
FIG. 3 is a diagram that depicts example components of a device that may correspond to the devices, or that may execute functions, that are depicted in FIGS. 1A and 1B.

FIG. 3 is a diagram that depicts example components of a device 300. UE 105 and devices implementing (or executing functions associated with) AMF 120, PCT 135, UDM 140, SMF 125, UPF 130, MME 165, HSS 175, S-GW 160, P-GW 155, PCRF 180, and/or a device(s) associated with the gNBs 185 of Next Generation RAN 145 or eNBs 190 of LTE RAN 170 may be similarly configured. Device 300 may include a bus 310, a processing unit 320, a memory 330, an input device(s) 340, an output device(s) 350, and a communication interface 360. Bus 310 may include a path that permits communication among the components of device 300.

Processing unit 320 may include one or more processors or microprocessors, or processing logic, which may interpret and execute instructions. Memory 330 may include a random access memory (RAM) or another type of dynamic storage device that may store information and instructions for execution by processing unit 320. Memory 330 may further include a Read Only Memory (ROM) device or another type of static storage device that may store static information and instructions for use by processing unit 320. Memory 330 may also include a magnetic and/or optical recording medium. Memory 330 may be referred to herein as a "tangible non-transitory computer-readable medium," a "non-transitory computer-readable medium," or a "non-transitory storage medium." In some implementations, the processes/methods set forth herein can be implemented as instructions that are stored in memory 330 for execution by processing unit 320.

Input device 340 may include one or more mechanisms that permit an operator to input information into device 300, such as, for example, a keypad or a keyboard, a display with a touch sensitive panel, voice recognition and/or biometric mechanisms, etc. Output device 350 may include one or more mechanisms that output information to the operator, including a display, a speaker, etc. Input device 340 and output device 350 may, in some implementations, be implemented as a user interface (UI) that displays UI information and which receives user input via the UI. Communication interface 360 may include one or more transceivers that enable device 300 to communicate with other devices and/or systems. For example, communication interface 360 may include wired or wireless transceivers for communicating via Next Generation Mobile Network 110, 4G Mobile Network 115, NSA Next Generation RAN 145, and/or Packet Data Network 150.

The configuration of components of device 300 illustrated in FIG. 3 is for illustrative purposes. Other configurations may be implemented. Therefore, device 300 may include additional, fewer and/or different components than those depicted in FIG. 3.

Figure 4:
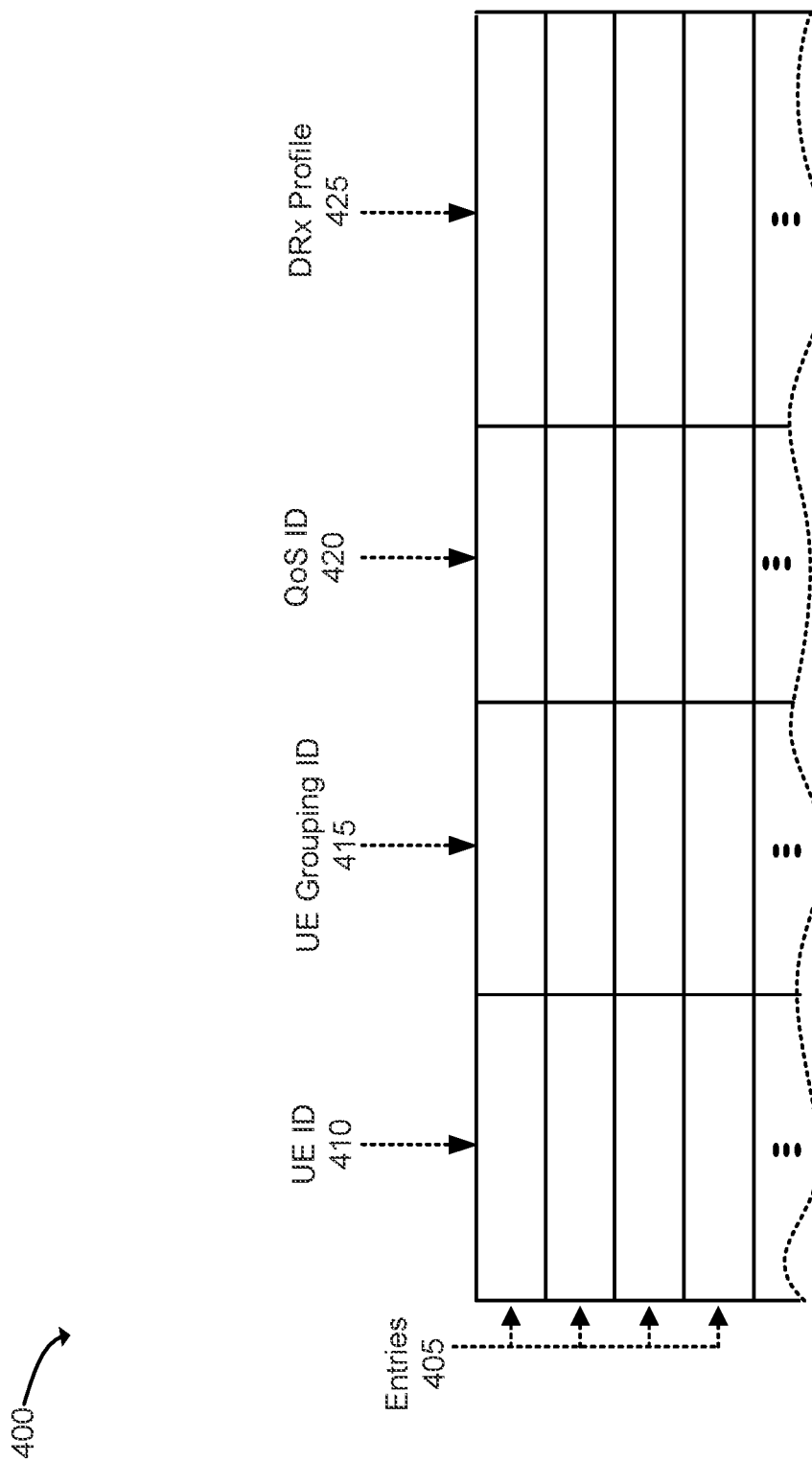
FIG. 4 depicts an example implementation of a data structure that may be stored in a memory associated with each Next Generation NodeB or evolved NodeB of the network environments of FIGS. 1A and 1B.

FIG. 4 depicts an example implementation of a data structure 400 that may be stored in a memory associated with, for example, each gNB of Next Generation RAN 145 or each eNB of LTE RAN 170. The data structure 400 may alternatively be stored in a memory in association with one or more other devices of Next Generation RAN 145, LTE RAN 170, or other devices/nodes of Next Generation Mobile Network 110 and/or 4G Mobile Network 115. As shown, the data structure 400 may include multiple entries 405, with each entry 405 including, for example, a UE Identifier (ID) field 410, a UE group ID field 415, a Quality of Service (QoS) ID field 420, and a DRx Profile field 425. The fields of entries 405 of data structure 400 may be generated and/or updated during execution of the process of FIG. 5 below.

UE ID field 410 stores a globally unique ID for a particular UE, or for the subscriber associated with the UE. For example, UE ID field 410 may store an International Mobile Subscriber Identity (IMSI) for a subscriber. UE group ID field 415 may store a unique ID associated with a group of UEs, of which the UE identified in field 410 is a member. UEs having similar QoS requirements may be grouped together and identified with a same UE group ID. The UE group ID may include, for example a Subscriber Profile ID (SPID) or a network slicing ID. The network slicing ID may include, for example, a Network Slice Selection Assistance Information (S-NSSAI) value that uniquely identifies the network slice. The S-NSSAI value may include a Slice/Service Type (SST) value and a Slice Differentiator (SD) value (e.g., S-NSSAI=SST+SD). The SST may define the expected behavior of the network slice in terms of specific features and services. The SD value may be directly related to the SST value and may be used as an additional differentiator (e.g., if multiple network slices carry the same SST value).

QoS ID field 420 may store an ID that uniquely identifies the QoS requirements of the group of UEs identified by the group ID stored in field 415. DRx Profile 425 may store adjusted DRx parameters associated with instructing the UE identified in field 410 to perform DRx in accordance with the adjusted DRx parameters. The DRx parameters may include, for example, an On Duration Timer, a DRx Short Cycle Timer, a DRx Inactivity Timer, and/or a DRx-Retransmission timer, one or more of which may have been adjusted/modified to increase or decrease the DRx wait-time of the UE identified in field 410.

To locate a particular entry 405, data structure 400 may be queried with particular data to locate an entry 405 having matching data stored in one of the fields 410, 415, 420, and/or 425. When such an entry 405 is located, data may be stored in one or more fields of the entry 405, or data may be retrieved from one or more fields of the entry 405. For example, if a UE ID for a particular UE 105 is known, then the entries 405 of data structure 400 may be queried to locate an entry 405 having a UE ID stored in field 410. In this example, upon locating the entry 405 with a matching field to the known UE ID, then the data stored in UE group ID field 415, QoS ID field 420, and/or DRx Profile field 425 may be retrieved.

Data structure 400 of FIG. 4 is depicted as including a tabular data structure with a certain number of fields having certain content. The tabular data structure shown in FIG. 4, however, is for illustrative purposes. Other types of data structures may alternatively be used. The number, types, and content of the entries and/or fields in the data structures illustrated in FIG. 4 are also for illustrative purposes. Other data structures having different numbers, types, and/or content of the entries and/or the fields may be implemented. Therefore, the data structure 400 depicted in FIG. 4 may include additional, fewer and/or different entries and/or fields than those shown.

Figure 5:
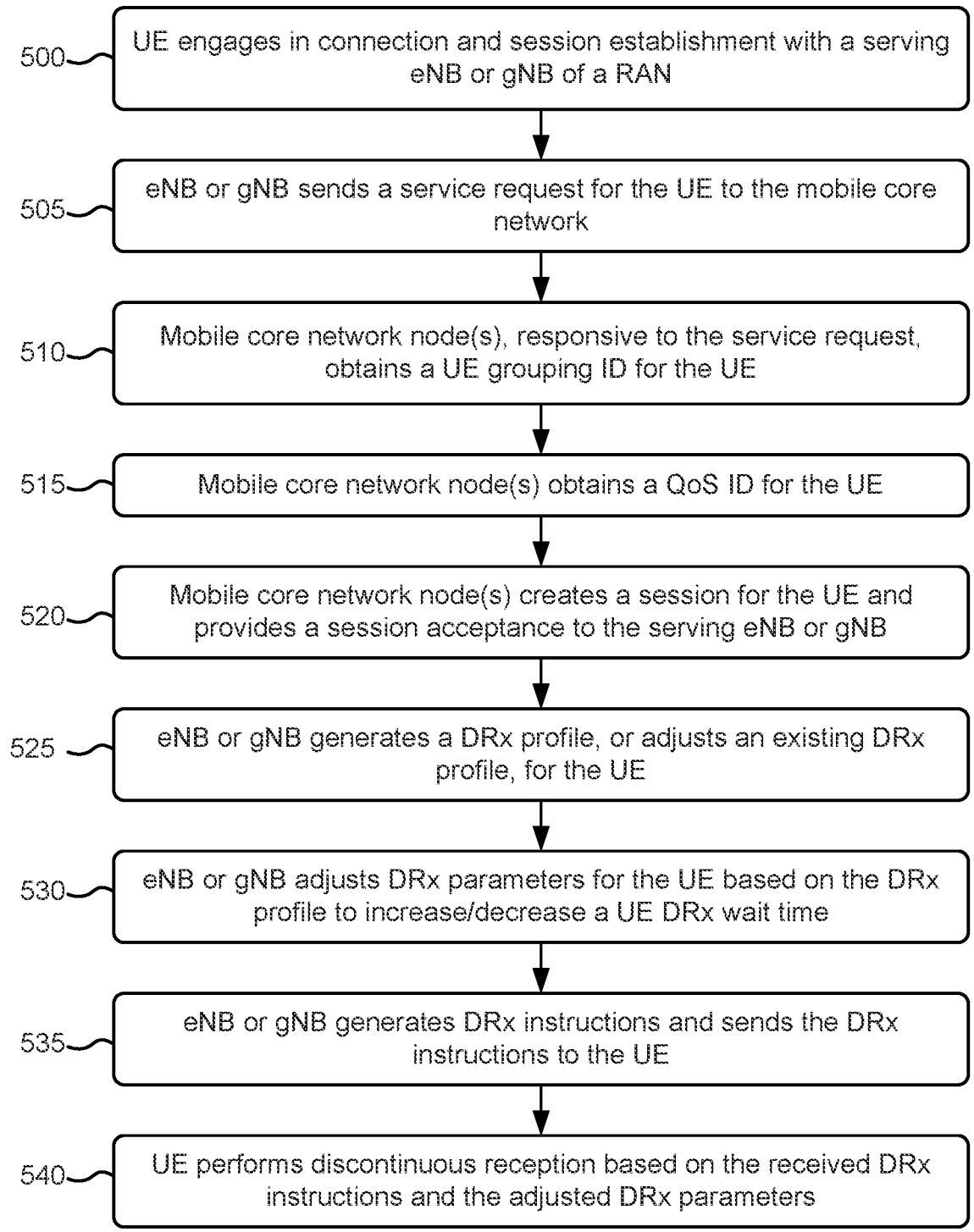
FIG. 5 is a flow diagram of an example process for adjusting DRx parametersto increase or decrease a DRx wait-time during a UE's execution of DRx procedures.

FIG. 5 is a flow diagram of an example process for adjusting DRx parameters, based on a UE 105's group ID, the UE's QoS requirements, and/or the UE's service profile, to increase or decrease a UE wait-time during the UE 105's execution of DRx. The example process of FIG. 5 may be implemented by a UE 105, an eNB or gNB, and/or other nodes within Next Generation Mobile Network 110 or 4G Mobile Network 115 operating together. The example process of FIG. 5 is described below with reference to the example messaging/operations/data flow diagrams of FIGS. 6 and 7. The example process of FIG. 5 may, for example, be repeated each time a UE 105 attempts to establish a connection and session with the mobile network 110 and/or 115.

Figure 6:
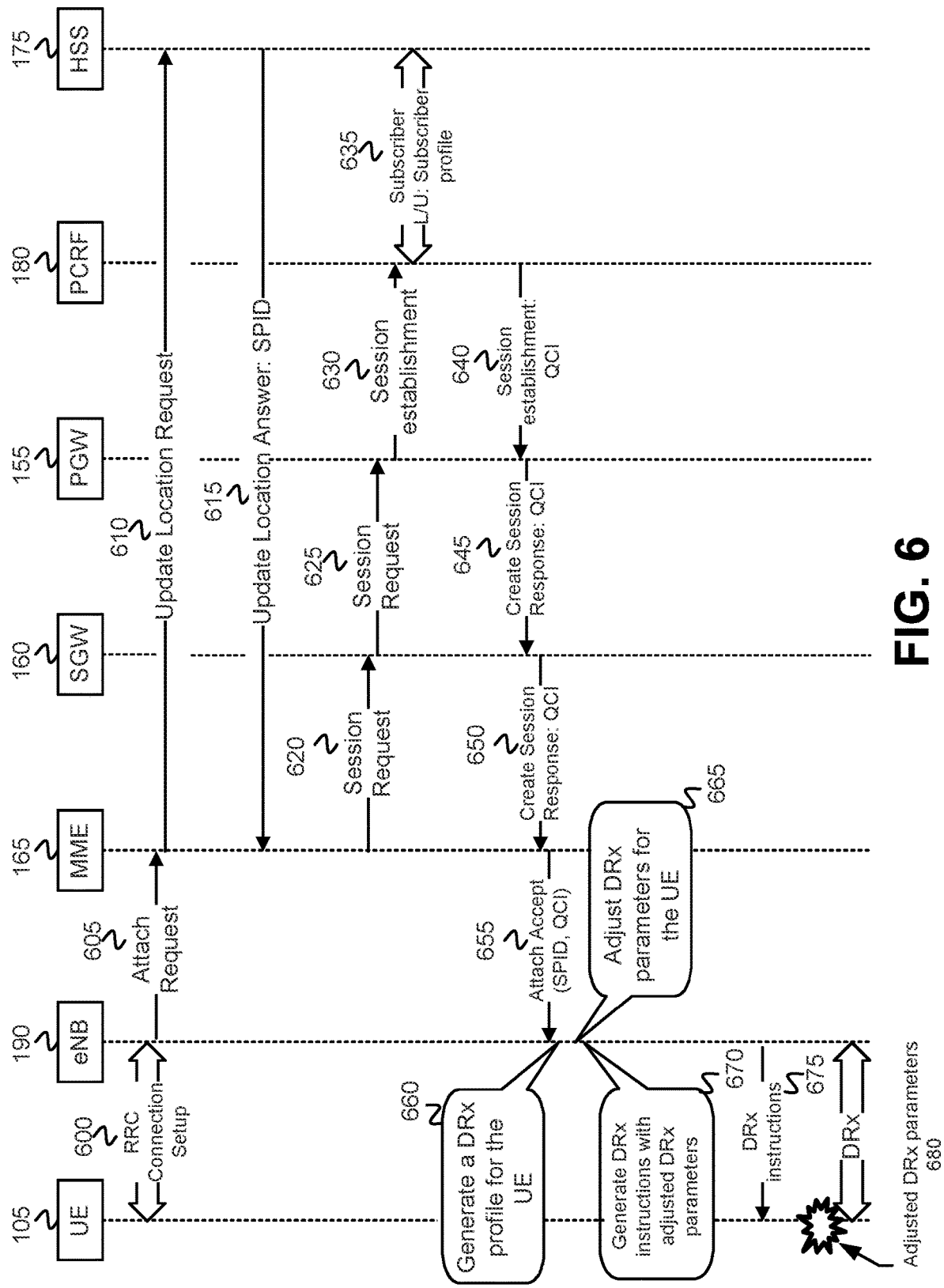
FIGS. 6 and 7 depict examples of operations, messages, and data flows associated with the process of FIG. 5.
Figure 7:
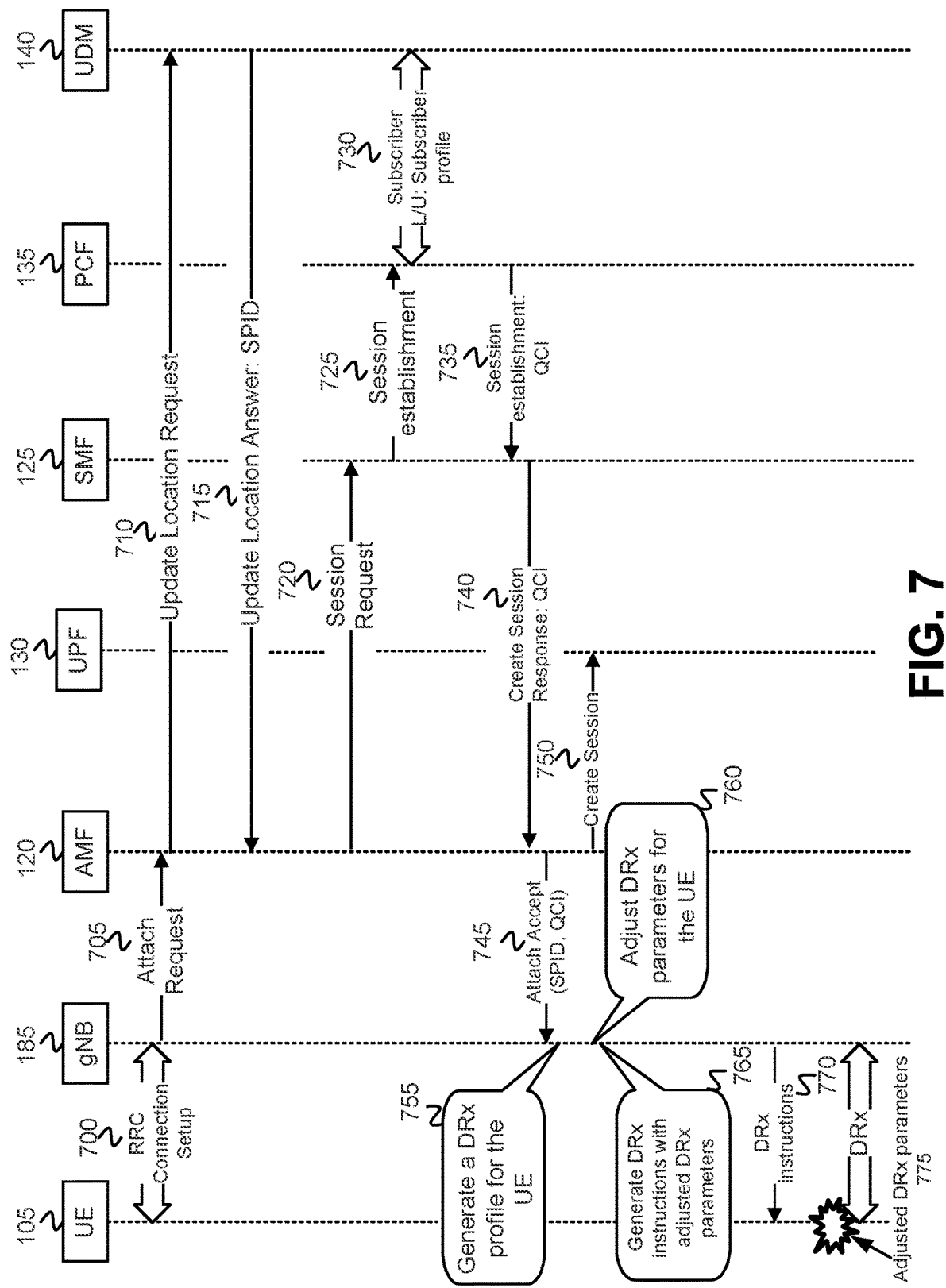

The example process may include a UE 105 engaging in connection and session establishment with a serving eNB or gNB of a RAN 145 or 170 (block 500). FIG. 6 depicts an example of an example of a UE 105 engaging in connection and session establishment with an eNB 190 of 4G Mobile Network 115, and FIG. 7 depicts an example of a UE 105 engaging in connection and session establishment with a gNB 185 of Next Generation Mobile Network 110. As shown in the example of FIG. 6, UE 105 may engage in a Radio Resource Control (RRC) connection setup process 600 with eNB 190, or, as shown in the example of FIG. 7, UE 105 may engage in a RRC connection setup process 700 with a gNB 185.

The serving eNB or gNB of the RAN sends a service request for the UE 105 to the mobile core network (block 505). In the example of FIG. 6, eNB 190, subsequent to RRC connection setup 600, sends an Attach Request 605 to MME 165 which, in turn, sends an Update Location Request 610 to HSS 175. Similarly, in the example of FIG. 7, gNB 185, subsequent to RRC connection setup 700, sends an Attach Request 705 to AMF 120 which, in turn, sends an Update Location Request 710 to UDM 140.

A mobile core network node(s), responsive to the service request, obtains a UE group ID for the UE 105 (block 510). The UE group ID may include, for example, a Subscriber Profile ID (SPID) associated with the UE 105, or a network slicing ID that identifies a network slice of the wireless mobile network that services the UE 105. In a 5G implementation, the network slicing ID may include a Network Slice Selection Assistance Information (S-NSSAI) value. In the example of FIG. 6, upon receipt of the Update Location Request 710, HSS 175 performs a lookup to retrieve a SPID of the UE 105, or a network slicing ID (e.g., S-NSSAI) for the UE 105. HSS 175 returns an Update Location Answer 615 to the MME 165 that includes the UE group ID (e.g., SPID or S-NSSAI). Similarly, in the example of FIG. 7, upon receipt of the Update Location Request 710, UDM 140 performs a lookup to retrieve a SPID of the UE 105, or a network slicing ID (e.g., S-NSSAI) for the UE 105. UDM 140 returns an Update Location Answer 715 to the ME 165 that includes the UE group ID (e.g., SPID or S-NSSAI).

The mobile core network node(s) obtains a QoS ID for the UE (block 515). The QoS ID may include, for example, a QoS Class ID (QCI) or a 5G QoS ID (5QI). In the example of FIG. 6, MME 165, upon receipt of the Update Location Answer 615 from HSS 175, may send a Session Request 620 to SGW 160, which, in turn, sends a corresponding Session Request 625 to PGW 155. PGW 155 sends a Session Establishment message 630 to PCRF 180, which engages in a subscriber lookup 635 with HSS 175 to retrieve a subscriber service profile associated with the UE 105. The subscriber service profile may specify, among other service parameters, QoS requirements (e.g., a QoS ID) of the network service requested by the UE 105. The subscriber service profile may specify other service parameters, such as, for example, whether the UE 105 operates in one or more power saving modes (e.g., an enhanced Mobile Broadband (eMBB) mode) or a lower latency mode (e.g., an Ultra Reliable Low Latency Communications (URLLC) mode)). Upon retrieval of the subscriber service profile, PCRF 180 obtains a QoS ID (e.g., a QCI) for the UE 105 and returns a Session Establishment message 640 to the PGW 155 that includes the QoS ID. PCRF 180 may obtain the QoS ID directly from the subscriber service profile or may determine the QoS ID based on contents of the subscriber service profile. For example, the subscriber service profile may indicate a particular level of network service (e.g., eMBB or URLLC) for the UE 105, and PCRF 180 may map the particular level of network level of network service to a QoS ID.

In the example of FIG. 7, AMF 120, upon receipt of the Update Location Answer 715 from UDM 140, may send a Session Request 720 to SMF 125, which, in turn, sends a Session Establishment message 725 to PCF 135. PCF 135 engages in a subscriber lookup 730 with UDM 140 to retrieve a subscriber service profile associated with the UE 105. Upon retrieval of the subscriber service profile, PCF 135 obtains a QoS ID (e.g., a 5QI) for the UE 105 and returns a Session Establishment message 735 to the SMF 125 that includes the QoS ID. PCF 135 may obtain the QoS ID directly from the subscriber service profile or may determine the QoS ID based on the contents of the subscriber service profile.

The mobile core network node(s) creates a session for the UE and provides a session acceptance, that may include the UE group ID and the QoS ID, to the serving eNB 190 or gNB 185 (block 520). Upon receipt of the session acceptance, the eNB 190 or gNB 185 may store the UE's ID in field 410, the UE group ID in field 415, and the QoS ID in field 420 of an entry 405 of data structure 400. In the example of FIG. 6, PGW 155, in response to session establishment message 640, sends a Create Session Response 645, that includes the QoS ID, and SGW 160, in turn, sends a Create Session Response 650 to MME 165 that also includes the QoS ID. Based on receipt of Create Session Response message 650, MME 165 sends an Attach Accept message 655 to eNB 190. The Attach Accept message 655 may include the UE group ID (e.g., SPID or S-NSSAI) and the QoS ID (e.g., QCI or 5QI). In the example of FIG. 7, SMF 125, in response to session establishment message 735, sends a Create Session Response 740, that includes the QoS ID to AMF 120, and AMF 120, in turn, sends a Create Session message 750 to UPF 130. Based on receipt of Create Session Response message 740, AMF 120 sends an Attach Accept message 745 to gNB 185. The Attach Accept message 745 may include the UE group ID (e.g., SPID or S-NSSAI) and the QoS ID (e.g., QCI or 5QI).

The eNB 190 or gNB 185, responsive to receipt of the session acceptance, generates a DRx Profile, or adjusts an existing DRx Profile, for the UE 105 based on the UE group ID, the QoS ID, and/or the SA or NSA (block 525). The eNB 190 or gNB 185 may store the generated DRx profile in field 425 of the entry 405 of data structure 400 used in block 520. The eNB 190 or gNB 185 may determine updated DRx parameters associated with performing DRx at the UE 105 based on the UE group ID, the QoS ID, and based on whether the UE 105 is currently being serviced by a SA network (e.g., by SA Next Generation Mobile Network 110) or by an NSA network (e.g., by NSA Next Generation RAN 145). The DRx profile may include, among other parameters, the DRx parameters associated with performing DRx at the UE 105 that may be modified to satisfy performance requirements associated with the UE group ID and the QoS ID. The DRx parameters may include, for example, a parameter value for the On Duration Timer, a parameter value for the DRx Short Cycle Timer, a parameter value for the DRx Inactivity Timer, and/or a parameter value for the DRx Retransmission timer. The DRx parameters may further include a specified maximum time period between the receipt of pending uplink data at the UE 105, and the UE 105 sending a scheduling request to the mobile network. This maximum time period may be a value set by the eNB 190 or gNB 185 based on the mode of the UE 105, such as, for example, whether the UE 105 is in a power saving mode or a low latency mode. For example, a UE 105 in a power saving mode will have the maximum time period set to a large value than another UE 105 in a low latency mode, which will be set to a shorter value.

The duration of a DRx wait time(s) for the UE 105 is dependent on the various DRx parameters, and the DRx wait time(s) for the UE 105 directly relates to a level of power saving at the UE 105's receiver and to a latency associated with an uplink from, or downlink to, the UE 105. For example, if the DRx parameters for a UE 105 have a lengthy Off Duration period 215 of the DRx Cycle 200, then the latency associated with a downlink transmission to the UE 105 may be larger than if the Off Duration period 215 is shorter. The eNB or gNB may determine updated values for the various DRx parameters based on, among other factors, the UE group ID (e.g., the SPID or S-NSSAI) and the QoS ID (e.g., the QCI or 5QI) for the UE 105. In the example of FIG. 6, eNB 190 is shown generating 660 a DRx profile for the UE 105. In the additional example of FIG. 7, gNB 185 is shown generating 775 a DRx profile for the UE 105.

The eNB 190 or gNB 185 adjusts existing DRx parameters for the UE 105 based on the DRx Profile to increase/decrease a UE DRx wait time (block 530) and generates DRx instructions, that include the adjusted DRx parameters, and sends the DRx instructions to the UE 105 (block 535). The eNB 190 or gNB 185 may have pre-stored default DRx parameters for DRx that may be adjusted for this particular UE 105 to conform to the updated DRx parameters determined in block 525. The DRx parameters, such as, for example, a parameter value for the On Duration Timer, a parameter value for the DRx Short Cycle Timer, a parameter value for the DRx Inactivity Timer, and/or a parameter value for the DRx Retransmission timer may be modified or adjusted to increase or decrease the UE DRx wait time in conformance with the DRx profile associated with the UE 105, and based on the performance requirements associated with the UE group ID and the QoS ID used to generate the DRx profile. For example, an increase in the parameter value for the Inactivity Timer leads to a shorter UE waiting time which, in turn, results in a decreased latency. Conversely, a decrease in the parameter value for the Inactivity Timer leads to a longer UE wait time which, in turn, results in an increased latency. The eNB 190 or gNB 185 may generate a message that includes DRx instructions, further including the adjusted DRx parameters of block 530, and sends the DRx instructions to the UE 105. The DRx instructions may further specify a maximum time period between the receipt of pending uplink data at the particular UE 105, and the UE 105 sending a scheduling request to the mobile network. As described above, this maximum time period may set to a particular value based on the mode (e.g., power saving mode, low latency mode) of the UE 105. In the example of FIG. 6, eNB 190 is shown adjusting 665 DRx parameters for the UE 105, and sending DRx instructions 675 to UE 105. In the additional example of FIG. 7, gNB 185 is shown adjusting 760 DRx parameters for the UE 105, and sending DRx instructions 770 to UE 105.

The UE 105, upon receipt of the DRx instructions, performs discontinuous reception based on the received DRx instructions and the adjusted DRx parameters, with the UE DRx wait time being based on the adjusted DRx parameters (block 540). The UE 105 extracts the one or more adjusted DRx parameters from the received DRx instructions and subsequently performs DRx using the adjusted DRx parameter(s) and possibly other non-adjusted DRx parameters. One or more of the DRx parameters, such as, for example, the parameter value for the On Duration Timer, the parameter value for the DRx Short Cycle Timer, the parameter value for the DRx Inactivity Timer, the parameter value for the DRx Retransmission timer and/or a maximum time period between the receipt of pending uplink data at the UE 105 and the UE 105 sending a scheduling request to the mobile network may have been modified/adjusted by the eNB 190 or gNB 185 in block 530, and the UE 105 may alter its performance of DRx, using the modified/adjusted DRx parameter(s) to increase or decrease the UE 105's DRx wait time. In the example of FIG. 6, UE 105 engages in DRx with eNB 190, using the adjusted DRx parameters 680 received in the DRx instructions 675 from eNB 190. In the example of FIG. 7, UE 105 engages in DRx with gNB 185, using the adjusted DRx parameters 775 received in the DRx instructions 770 from gNB 185.

The foregoing description of implementations provides illustration but is not intended to be exhaustive or to limit the invention to the precise form disclosed. Modifications and variations are possible in light of the above teachings or may be acquired from practice of the invention. For example, while series of blocks have been described with respect to FIG. 5, and sequences of operations, messages, and data flows with respect to FIGS. 6 and 7, the order of the blocks and/or the operations, messages, and data flows may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processing unit 320) of a device. A non-transitory storage medium includes one or more of the storage mediums described in relation to memory 330. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device of a wireless network, a message associated with creating a session for a User Equipment device (UE);
   determining, by the device, a mode of the UE, wherein the determined mode comprises one of multiple different modes and wherein the multiple different modes comprise a power saving mode and a low latency mode;
   determining, by the device, performance requirements associated with a Quality of Service (QOS) further associated with the session;
   specifying, when the determined mode of the UE comprises the power saving mode, a first maximum UE wait time associated with a discontinuous reception (DRx) process involving the UE;
   specifying, when the determined mode of the UE comprises the low latency mode, a second maximum UE wait time associated with the DRx process involving the UE, wherein the first maximum UE wait time comprises a first maximum time period, and the second maximum UE wait time comprises a second maximum time period, with each of the first maximum time period and the second time period encompassing receipt of pending uplink data at the UE, the UE sending a scheduling request to the wireless network, and the UE receiving an uplink grant in response to the scheduling request, and further includes any intervening time caused by components of the UE being in a powered down state during the DRx process and wherein the second maximum time period comprises a shorter time period than the first maximum time period;
   modifying, by the device when the determined mode of the UE comprises the power saving mode, DRx parameters for the UE based on the determined performance requirements and the specified first maximum UE wait time;
   modifying, by the device when the determined mode of the UE comprises the low latency mode, the DRx parameters for the UE based on the determined performance requirements and the specified second maximum UE wait time; and
   instructing, by the device, the UE to perform the DRx process using the modified DRx parameters.

2. The method of claim 1, wherein instructing the UE to perform the DRx process comprises:
   generating, by the device, DRx instructions that include the modified DRx parameters; and
   sending, by the device, the DRx instructions to the UE to instruct the UE to perform the DRx process using the modified DRx parameters.

3. The method of claim 1, wherein the device comprises a base station of a mobile wireless network.

4. The method of claim 1, wherein the QoS associated with the session is identified by a QoS Class ID (QCI) or a Fifth Generation QOS ID (5QI) included in the message.

5. The method of claim 1, wherein modifying the DRx parameters for the UE comprises:
   modifying at least one of an On Duration Timer, a DRx Short Cycle Timer, a DRx Inactivity Timer, or a DRx Retransmission timer to satisfy the determined performance requirements.

6. The method of claim 1, wherein the wireless network comprises a mobile wireless network and wherein modifying the DRx parameters further comprises:
   modifying the DRx parameters further based on whether the UE is currently being serviced by a Stand Alone (SA) mobile wireless network or by a Non-Stand Alone (NSA) mobile wireless network.

7. The method of claim 1, further comprising:
   obtaining, by the device, a network slicing ID that identifies a network slice of the wireless network that services the session for the UE,
   wherein determining the performance requirements further comprises:
   determining further ones of the performance requirements associated with the network slicing ID.

8. The method of claim 1, wherein modifying, when the determined mode comprises the power saving mode or when the determined mode comprises the low latency mode, the DRx parameters for the UE comprises:
   modifying at least one of a DRx Inactivity Timer or a DRx Retransmission timer to satisfy the determined performance requirements,
   wherein the DRx Inactivity Timer comprises a timer value that specifies how long a receiver of the UE should remain powered on before powering down after receipt of a signal on a control channel, and
   wherein the DRx Retransmission timer comprises a timer value that specifies a period of time that the UE should remain active to wait on an incoming retransmission after a first available retransmission time.

9. A device, comprising:
   a communication interface configured to receive a message associated with creating a session in a wireless network for a User Equipment device (UE); and
   a processing unit configured to:
   determine a mode of the UE, wherein the determined mode comprises one of multiple different modes and wherein the multiple different modes comprise a
power saving mode and a low latency mode,
determine performance requirements associated with a
Quality of Service (Qos) further associated with the
session,
specify, when the determined mode of the UE comprises the power saving mode, a first maximum UE
wait time associated with a discontinuous reception
(DRx) process involving the UE,
specify, when the determined mode of the UE comprises the low latency mode, a second maximum UE
wait time associated with the DRx process involving
the UE,
wherein the first maximum UE wait time comprises a first
maximum time period, and the second maximum UE
wait time comprises a second maximum time period,
with each of the first maximum time period and the
second time period encompassing receipt of pending
uplink data at the UE, the UE sending a scheduling
request to the wireless network, and the UE receiving
an uplink grant in response to the scheduling request,
and further includes any intervening time caused by
components of the UE being in a powered down state
during the DRx process and wherein the second maximum time period comprises a shorter time period than
the first maximum time period, modify, when the
determined mode of the UE comprises the power
saving mode, DRx discontinuous reception (DRx)
parameters for the UE based on the determined performance requirements and the specified first maximum
UE wait time, and
modify, when the determined mode of the UE comprises the low latency mode, the DRx parameters for
the UE based on the determined performance
requirements and the specified second maximum UE
wait time, and
instruct the UE to perform the DRx process using the
modified DRx parameters.

10. The device of claim 9, wherein, when instructing the UE to perform the DRx process, the processing unit is further configured to:
generate DRx instructions that include the modified DRx parameters; and
send, via the communication interface, the DRx instructions to the UE to instruct the UE to perform the DRx process using the modified DRx parameters.

11. The device of claim 9, wherein the QoS associated with the session is identified by a QoS Class ID (QCI) or a Fifth Generation QoS ID (5QI) included in the message.

12. The device of claim 9, wherein, when modifying the DRx parameters for the UE, the processing unit is further configured to:
modify at least one of an On Duration Timer, a DRx Short Cycle Timer, a DRx Inactivity Timer, or a DRx Retransmission timer to satisfy the determined performance requirements.

13. The device of claim 9, wherein the wireless network comprises a mobile wireless network and wherein, when modifying the DRx parameters, the processing unit is further configured to:
modify the DRx parameters further based on whether the UE is currently being serviced by a Stand Alone (SA) mobile wireless network or by a Non-Stand Alone (NSA) mobile wireless network.

14. The device of claim 9, wherein the processing unit is further configured to:

obtain a network slicing ID that identifies a network slice of the wireless network that services the session for the UE,
wherein, when determining the performance requirements, the processing unit is further configured to:
determine further ones of the performance requirements associated with the network slicing ID.

15. The device of claim 9, wherein, when modifying, when the determined mode comprises the power saving mode or when the determined mode comprises the low latency mode, the DRx parameters for the UE, the processing unit is further configured to:
modify at least one of a DRx Inactivity Timer or a DRx Retransmission timer to satisfy the determined performance requirements,
wherein the DRx Inactivity Timer comprises a timer value that specifies how long a receiver of the UE should remain powered on before powering down after receipt of a signal on a control channel, and
wherein the DRx Retransmission timer comprises a timer value that specifies a period of time that the UE should remain active to wait on an incoming retransmission after a first available retransmission time.

16. A non-transitory storage medium storing instructions executable by a device, wherein execution of the instructions cause the device to:
receive a message associated with creating a session in a wireless network for a User Equipment device (UE);
determine a mode of the UE, wherein the determined mode comprises one of multiple different modes and wherein the multiple different modes comprise a power saving mode and a low latency mode;
determine performance requirements associated with a Quality of Service (QOS) further associated with the session;
specify, when the determined mode of the UE comprises the power saving mode, a first maximum UE wait time associated with a discontinuous reception (DRx) process involving the UE;
specify, when the determined mode of the UE comprises the low latency mode, a second maximum UE wait time associated with the DRx process involving the UE, wherein the first maximum UE wait time comprises a first maximum time period, and the second maximum UE wait time comprises a second maximum time period, with each of the first maximum time period and the second time period encompassing receipt of pending uplink data at the UE, the UE sending a scheduling request to the wireless network, and the UE receiving an uplink grant in response to the scheduling request, and further includes any intervening time caused by components of the UE being in a powered down state during the DRx process and wherein the second maximum time period comprises a shorter time period than the first maximum time period;
modify, when the determined mode of the UE comprises the power saving mode, DRx parameters for the UE based on the determined performance requirements and the specified first maximum UE wait time; and
modify, when the determined mode of the UE comprises the low latency mode, the DRx parameters for the UE based on the determined performance requirements and the specified second maximum UE wait time; and
instruct the UE to perform the DRx process using the modified DRx parameters.

17. The non-transitory storage medium of claim 16, wherein the instructions to cause the device to modify the DRx parameters for the UE further comprise instructions to cause the device to:

modify at least one of an On Duration Timer, a DRx Short Cycle Timer, a DRx Inactivity Timer, or a DRx Retransmission timer to satisfy the determined performance requirements.

18. The non-transitory storage medium of claim 16, wherein the wireless network comprises a mobile wireless network and wherein execution of the instructions to cause the device to modify the DRx parameters further cause the device to:

modify the DRx parameters further based on whether the UE is currently being serviced by a Stand Alone (SA) mobile wireless network or by a Non-Stand Alone (NSA) mobile wireless network.

19. The non-transitory storage medium of claim 16, wherein execution of the instructions further causes the device to:

obtain a network slicing ID that identifies a network slice of the wireless network that services the session for the UE, wherein, when execution of the instructions to determine the performance requirements further causes the device to:

determine further ones of the performance requirements associated with the network slicing ID.

20. The non-transitory storage medium of claim 16, wherein the instructions to cause the device to modify, when the determined mode comprises the power saving mode or when the determined mode comprises the low latency mode, the DRx parameters for the UE further comprise instructions to cause the device to:

modify at least one of a DRx Inactivity Timer or a DRx Retransmission timer to satisfy the determined performance requirements, wherein the DRx Inactivity Timer comprises a timer value that specifies how long a receiver of the UE should remain powered on before powering down after receipt of a signal on a control channel, and wherein the DRx Retransmission timer comprises a timer value that specifies a period of time that the UE should remain active to wait on an incoming retransmission after a first available retransmission time.

* * * * *